(12) United States Patent
Seeds

(10) Patent No.: US 6,763,520 B1
(45) Date of Patent: Jul. 13, 2004

(54) FAIR ASSIGNMENT OF PROCESSING RESOURCES TO QUEUED REQUESTS

(75) Inventor: Glen Seeds, Nepean (CA)

(73) Assignee: Cognos Incorporated, Ottawa (CA)

(*) Notice: Subject to any disclaimer, the term of this patent is extended or adjusted under 35 U.S.C. 154(b) by 563 days.

(21) Appl. No.: 09/645,255

(22) Filed: Aug. 24, 2000

(51) Int. Cl.⁷ .............................................. G06F 9/00
(52) U.S. Cl. ..................... 718/101; 718/103; 718/105; 709/224; 709/226
(58) Field of Search ................. 709/100, 101, 709/102, 103, 104, 223, 224, 226, 203, 200; 707/8; 718/101, 102, 103

(56) References Cited

U.S. PATENT DOCUMENTS

| | | | |
|---|---|---|---|
| 5,504,894 A | | 4/1996 | Ferguson et al. |
| 5,799,173 A | * | 8/1998 | Gossler et al. ................ 703/21 |
| 5,925,098 A | * | 7/1999 | Freund et al. ............... 709/203 |
| 6,021,425 A | | 2/2000 | Waldron, III et al. |
| 6,055,564 A | | 4/2000 | Phaal |
| 6,055,579 A | | 4/2000 | Goyal et al. |
| 6,058,389 A | | 5/2000 | Chandra et al. |
| 6,289,343 B1 | * | 9/2001 | Freund et al. ................. 707/8 |
| 6,505,250 B2 | * | 1/2003 | Freund et al. ............... 709/226 |
| 6,542,920 B1 | * | 4/2003 | Belkin et al. ............... 709/104 |
| 6,604,125 B1 | * | 8/2003 | Belkin ........................ 709/104 |

* cited by examiner

Primary Examiner—Majid Banankhah
(74) Attorney, Agent, or Firm—Pearne & Gordon LLP (57) ABSTRACT

A request dispatching system is provided for dispatching requests to a system having a predetermined number of server instances. Each request has its service type. The request dispatching system uses one queue for each service type, and reserves for each queue a minimum number of server instances. In one embodiment, idle server instances may be configured on demand to serve requests of a different type.

16 Claims, 5 Drawing Sheets

FAIR ASSIGNMENT OF PROCESSING RESOURCES TO QUEUED REQUESTS

This invention relates to controlling of multi-processing servers, and more particularly, to fair assignment of processing resources to queued requests in multi-processing servers.

BACKGROUND OF THE INVENTION

There exist multi-processing server systems which are capable of serving many requests in parallel fashion. Requests may also be called tasks, jobs, loads, messages or consumers. A typical existing system uses multi-processing servers, all of which are capable of serving any type of request that is submitted to the system. Requests are processed by available servers as they are received by the system. When all servers become busy serving other requests, any new requests received by the system cannot be served as received. The system needs to handle those new outstanding requests. It is desirable to assign multi-processing servers and other processing resources in the system to those outstanding requests in a fair manner.

Some existing systems attempt to solve this problem by rejecting new requests when all servers are busy. Rejecting new requests is unfair because requests submitted later can be processed before ones submitted earlier and rejected.

Some existing systems attempt to provide fair assignment by queuing outstanding requests in the order of receipt while they are waiting to be served. A typical existing system provides a single queue for all outstanding requests, regardless of how many servers are available. In this system, when a server becomes available, a request at the head of the queue is simply dispatched to that server.

Queuing outstanding requests is fairer compared to rejection of them. However, when there are high priority requests and low priority requests, these conventional systems often allow high priority requests to completely block low priority requests, or even the reverse. This common phenomenon is called "starvation".

Some systems avoid the starvation problems by designing the system to handle requests in a fixed way, appropriate for a specific application and hardware configuration. This technique cannot be applied to other situations without a re-design.

Some systems work around the starvation problems by giving the administrator a high degree of instantaneous control over assignment of processing resources to requests. Such systems have a very high administrative cost to keep running well.

It is therefore desirable to provide a system which is capable of automatically assigning processing resources effectively and fairly to requests that exceed the system's capacity for concurrent processing.

SUMMARY OF THE INVENTION

In computers, requests are served by running process instances of server programs. Each such instance may serve more than one request concurrently, if the server program is multi-threaded. For the purpose of this invention, each such process of single-threaded programs or thread of multi-threaded programs is called a server instance. Each request has request parameters that determine the cost of-preparing a server instance to serve the request (e.g., starting a particular program, opening files, connecting to particular external resources). In the present invention, those request parameters are identified and used collectively to define a service type The present invention uses one queue for each service type, and reserves for each queue a minimum number of server instances.) In one embodiment, idle server instances may be configured on demand to serve requests of a different type.

In accordance with an aspect of the present invention, there is provided a method for dispatching requests to a predetermined number of server instances, in order to process multiple requests in parallel. Each request has a service type. The method comprises steps of utilizing one or more queues, each queue being associated with a service type for queuing requests having that service type; setting a minimum number of server instances for each queue; allocating to each queue at least the minimum number of server instances; preparing each server instance to provide a service type corresponding to that of the queue to which the server instance is allocated; and dispatching each request in each queue to its corresponding server instance when the server instance assigned to the server instance is available.

In accordance with another aspect of the invention, there is provided a request dispatching system for dispatching requests to a predetermined number of server instances, in order to process multiple requests in parallel. Each request has its service type and is queued in a queue which is associated with its service type. The request dispatching system comprises a server instance controller and a dispatching controller. The server instance controller is provided for controlling allocation of server instances to each queue such that each queue maintains at least a minimum number of server instances to serve requests of the service type of the queue. The dispatching controller is provided for controlling dispatching of each request in each queue to its corresponding server instance when the server instance reserved for the queue is available.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
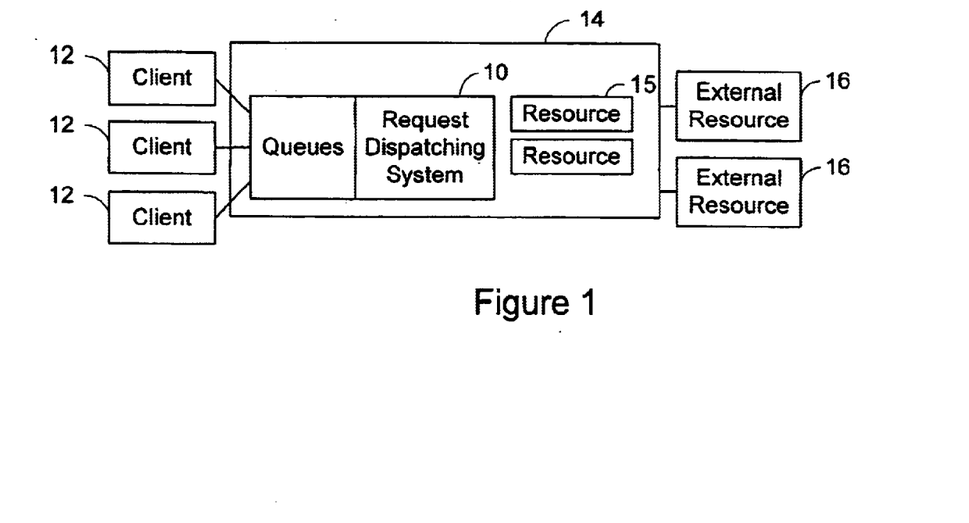
FIG. 1 is a block diagram showing a system having a request dispatching system in accordance with an embodiment of the present invention.
Figure 2:
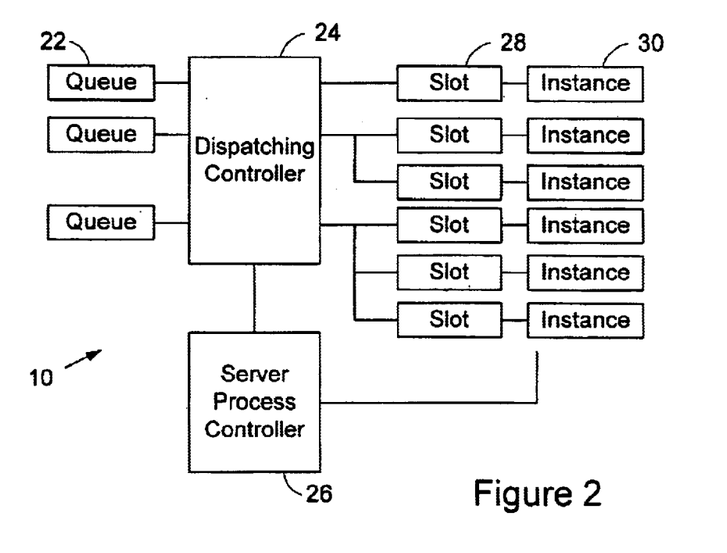
FIG. 2 is a block diagram showing a request dispatching system in accordance with an embodiment of the present invention.
Figure 3:
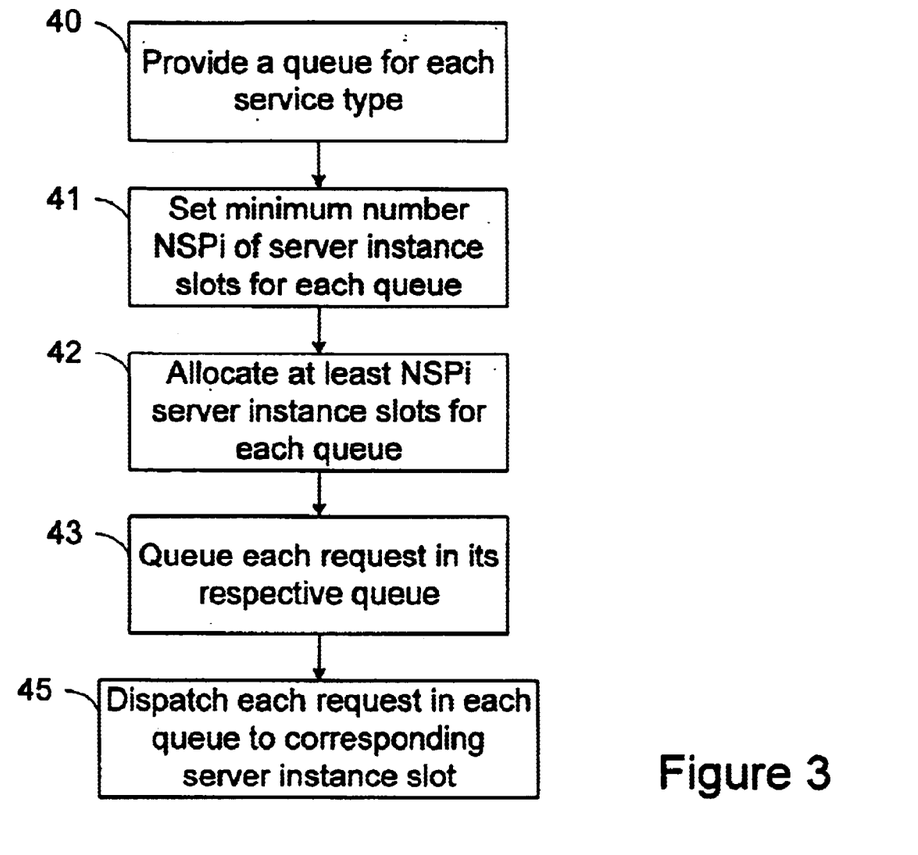
FIG. 3 is a flowchart showing the operation of the request dispatching system.

Referring to FIGS. 1 to 3, a request dispatching system 10 in accordance with an embodiment of the present invention is described.

FIGS. 1 and 2 show an example of the request dispatching system 10. The system 10 uses one or more queues 22, a dispatching controller 24 and a server instance controller 26. FIG. 2 schematically shows multiple server instances 30. Potential server instances are schematically shown as server instance slots 28.

The request dispatching system 10 provided in a computer system 14 receives requests from one or more clients 12. It controls dispatching of requests to server instances 30.

Each request has a service type. Preparation costs may be expressed in terms of real-time and other resources consumed by or reserved for the server instance.

The dispatching system 10 allows multiple requests to be processed in parallel by the multiple server instances 30. In this invention, the server instances 30 my represent multiple single-processing processors, processes or threads of one or more multiple-processing processors or any combination thereof. In the case where the server instances 30 include multiple single-processing processors, each processor is configurable to serve different types of requests.

In order to process requests, the server instances 30 can use a finite number of processing resources 15 within the computer system 14. The resources 15 provided internally in the server unit 14 may include one or more Central Processing Units (CPUs), physical memory and virtual memory swap space. The resources 15 are allocated to server instances by the host operating system according to its allocation policies. These policies can be influenced by parameters that are specified by this system. One such parameter is execution priority.

The physical memory available for application use (AM) is a configurable system parameter. It is not the total physical memory on the computer, but what is left after the system is up and running, with all applications loaded but idle. The amount of additional memory consumed by processing a request (RM) is also a configurable parameter.

Swap space is virtual memory (VM) disk space for handling swapping of server instances to and from physical memory. The virtual memory VM is also a configurable system parameter.

Server instances may also use one or more external resources 16, such as external servers, through external server connections.

It is desirable that processing resources are not only fairly allocated to requests, but also do not remain unused while there is a request available to which those resources can be applied.

In order to assign processing resources fairly to requests while using available resources efficiently, the request dispatching system 10 controls server instances 30. For example, it controls the starting and stopping of server instances, the service type of server instances, and the association of server instances with requests, i.e., the dispatching of requests to server instances. It may also control the host O/S process execution priority of the computer system 14, as described later.

The most precious processing resource 15 is usually CPUs. Accordingly, the present invention preferably minimizes the number of idle CPUs as long as there is a request to be served. However, the present invention may also be applied to other processing or related resources.

First Embodiment

Requests are queued using a suitable queuing controller. The request dispatching system 10 dequeues requests and dispatches them to server instances 30.

Each queue 22 is used for requests that have the same service type. For each service type, there may be one or more queues 22 provided.

When all other things are equal among requests, requests within a queue 22 are processed in the order in which they arrive.

The dispatching controller 24 controls the dispatch of requests from the queues 22 to server instances 30.

The dispatching controller 24 also controls the creation, allocation or preparation of the server instances 30.

The dispatching system 10 is further described referring to FIG. 3 which shows the operation of the request dispatching system 10 according to the first embodiment of the invention.

A queue 22 is provided for each service type of request (40).

An initial number of server instance slots 28 are provided. The server instance controller 26 sets a minimum number NSPi of server instance slots 28 for each queue 22 (41). The minimum number NSPi is configurable for each queue 22. It may be the same or different for each queue 22. The minimum number NSPi may be one or more, depending on the service type and the total number NS of server instances 30. As a queue 22 is associated with a service type, the server instance slot 28 reserved for the queue 22 is also associated with the service type. The minimum number NSPi of server instance slots 28 are reserved regardless of whether there are requests outstanding for that service type or not.

The server instance controller 26 then allocates server instance slots 28 to the queues 22 such that each queue 22 is assigned with at least the minimum number NSPi of server instance slots 28 (42). A queue 22 may be assigned with more server instance slots 28 than its minimum number NSPi when the total number NS of the server instance slots 28 is greater than the total number of the minimum number NSPi of each queue 22.

Requests are queued in corresponding queues based on the service type of the requests (43).

The server instance controller 26 assigns a server instance 30 to each server instance slot 28, and prepares the server instance 30 to serve requests having the service type of the server instance slot 28 (44).

The dispatching controller 24 dequeues requests from the queues 22 and dispatches each request to a corresponding server instance slot 28 of the server unit 14 when a server instance 30 assigned to the server instance slot 28 is available (45). Each dispatched request is then processed by the server instance 30 assigned to the server instance slot 28. Step 44 may be carried out during the dispatching operation by the dispatching controller 24 at step 45.

By reserving a predetermined minimum number NSPi of server instance slots 28 for each queue 22, the request dispatching system 10 can always allocate at least one server instance 30 to requests of each server type. Thus, requests of one service type are not blocked solely by requests of other service type. Accordingly, the starvation problems are eliminated.

Number of Server Instances and Minimum Server Instance Slots in the First Embodiment It is preferable to set the total number NS of active server instances 30 as large as possible without risking "thrashing". "Thrashing" is the phenomenon in which the system consumes more resources in allocating resources than in actually processing requests.

Providing more active server instances 30 allows more server instance slots 28 to be provided. For example, when server instances 30 use an external resource 16, server instances 30 that are running requests need to wait for the external resource 16 if it is busy. In that case, the more server instance slots 28 that are available for a queue 22, the less likely it is that that queue 22 will be blocked by the fact that all requests in process are blocked waiting for the external resource 16.

The total number NS of active process instances 30 is set not less than the total number NPQ of physical queues 22.

Server instance slots 28 may be moved or reallocated to a different queue 22. In order to avoid excessive swapping or swap space overflow, the total number NS of active server instances 30 is set no higher than AM divided by RM. AM is the amount of the physical memory available for application use. This is the physical memory on the computer system 14, that is still available after the entire system is up and running, with all applications loaded but idle. RM is the amount of additional physical memory consumed during processing of a request.

Then, the minimum number NSPi for each queue 22 is set equal to NS divided by NPQ. If the obtained value is not an integer, then it is rounded up starting at the highest priority, until the sum of all minimum numbers NSPi of all queues equals to the total number NS of active server instances 30.

Priority

Dispatching of requests is based on a set of attributes that describe the service type. Generic attributes may include interactive attributes, interactive or asynchronous attributes, and application-specific attributes. Additional generic attributes that are considered as balancing factors may include those representing priority, age, preparation costs and execution cost. Other attributes may include averages of above factors, number of queued items of specified types, total number of queued items, number of idle server instances, CPU utilization.

The commonly used service type of requests is defined by request priority alone. Some requests can take a very long time to run, e.g., hours. These requests are likely to be run infrequently, e.g., once a month, and can typically be delayed without serious consequences. It is preferable that these requests not block running of smaller, more time-critical requests. In order to deal with this, requests are prioritized.

In the following descriptions, the embodiments of the present invention are described mainly using a model which distinguishes service type only by priority. However, the present invention may be applicable to other service types and combinations of priority and other service types.

Administrators of the request dispatching system 10 or clients 12 set available priorities and provide a publicly visible prioritization scheme.

Request priority of each request may be set by the requestor when clients can be trusted to set priority reasonably. Alternatively, request priority may be set by the system, based on other request parameters, such as by application.

The number of available priority settings is a configurable parameter of the system 10. It is equal to the total number NPQ of physical priority queues. For example, if the available priorities are High, Normal, and Low, then NPQ=3. This parameter may be set at design time or at system configuration time.

An embodiment has three priorities: high, normal and low. The request dispatching system 10 provides three queues 22, as shown in FIG. 2. Each queue 22 is associated with each priority. The initial total number of server instance slots 28 is three or more. For each queue 22, a predetermined minimum number NSPi of server instance slots 28 are reserved.

Thus, while higher-priority requests may be blocked by a combination of lower-priority requests and requests at the same or higher priority, they are never blocked solely by lower-priority requests. Also, lower-priority requests are not blocked indefinitely by higher-priority requests that were submitted later. "Indefinitely" in this context means an amount of time that is long relative to the time required to satisfy the request. Lower-priority requests are allocated with resources at a rate that is lower than that for higher-priority requests, but is not zero. Thus, the request dispatching system 10 can respect priority while avoiding starvation. Also, it can maintain a fair balance of processing resource usage between priority and arrival time of requests.

The predetermined minimum number NSPi of server instance slots 28 for each queue is one or more. It is determined such that the minimum number of a queue associated with a higher priority is the same as or larger than that of a queue associated with a lower priority.

Operating System Process Priority

The computer system 14 has its host O/S process execution priority in order to allocate CPU resources 15 to server instances 30. It is desirable that the dispatching system 10 sets the host O/S thread execution priority according to the request priority, so that CPU resources 115 are allocated by request priority. This ensures that higher priority requests will execute faster than lower priority ones when all other conditions are equal. This approach also makes it probable that higher priority requests are dispatched more often than lower priority requests.

Second Embodiment: Switching of Service Type

In the first embodiment, the service type is defined by a single request parameter, e.g., priority. Service types are associated with a queue, and determine which queue a request is placed on.

The present invention may also be used for the service type which is defined by more than one request parameter. In this embodiment, service types are not associated with a queue, but are associated with significant re-usable preparation costs. Among those request parameters defining the service type, there may be a primary parameter and one or more secondary parameters.

In this case, each queue 22 may be used for queuing requests which have the same or similar service type. For example, each queue 22 may be used for queuing requests having the same primary parameter. Secondary parameters may not be the same as those of other requests.

When a server instance 30 is prepared for a service type, the first request in the corresponding queue may not have a service type that matches that of the server instance 30. The present invention may allow dispatching of a request other than the first in the queue if it has a matching service type. Also, a server instance 30 may be switched to process a request that has the same primary parameter but different secondary parameters with relatively small preparation costs, compared to the costs needed to prepare for a service type having a different primary parameter. These processes of dispatching and switching are further described below referring to FIGS. 4–7.

In this embodiment, the service type is defined by request priority as a primary parameter.

When the total number NS of active server instances 30 is larger than the sum of the minimum number NSPi of server instance slots 28 reserved for each queue 22, one or more additional server instance slots 28 may be provided to one or more queues 22.

Server instances 30 are not permanently reserved by service type. An idle server instance 30 can switch or reconfigure its service type to a different service type.

Whenever a server instance 30 is idle and there are queued requests, then in some sense there are resources that are not being effectively used. However, an idle server instance 30 does not necessarily mean that one of the pending requests could be effectively serviced if dispatched immediately to the idle server instance 30; it depends on what it would cost to prepare that server instance 30 for use with the request in question. In principle, if all incoming requests are directed to idle server instances 30 with a matching service type, then preparation costs are minimized or avoided, and processing time is improved correspondingly. For example, if it would cost 10 seconds to do this for the request at the head of the queue 22, and it is likely that another server instance 30 will likely become free in less than 10 seconds, which only takes 1 second to prepare because it is a better type match, then it is better to wait for that server instance to become free.

Figure 4:
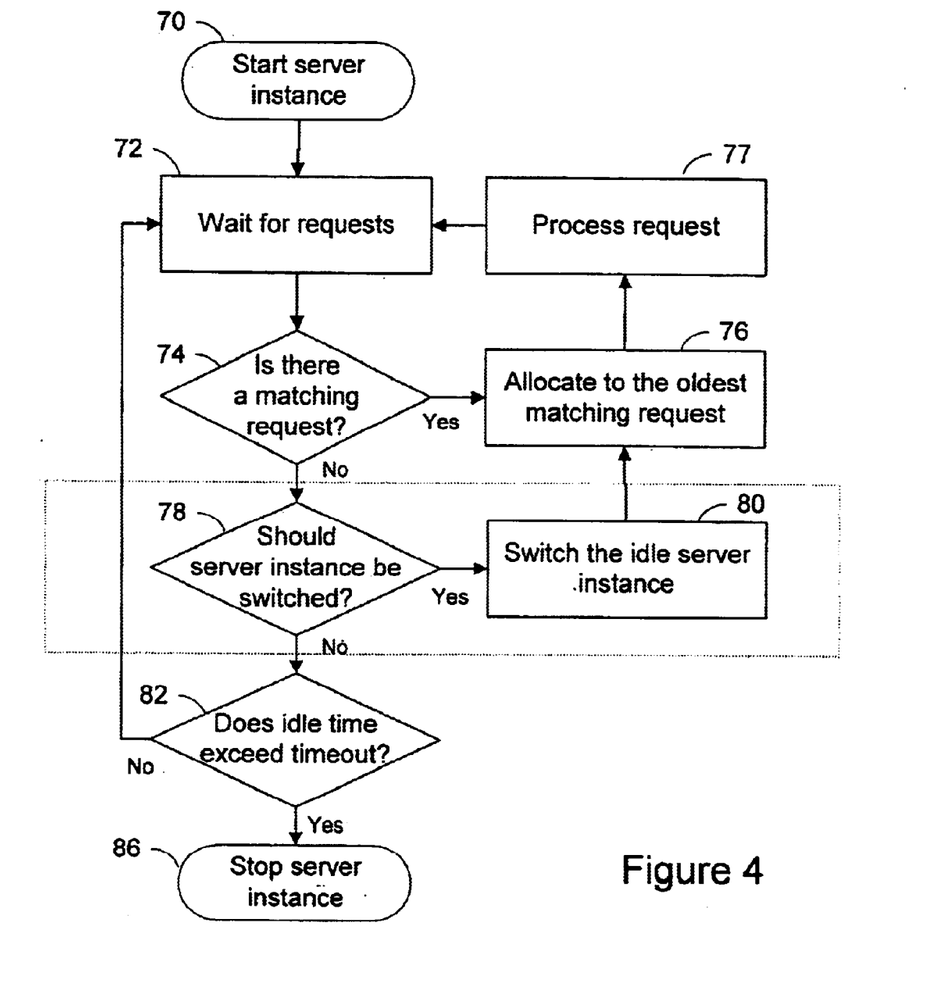
FIG. 4 is a flowchart showing an example process of selecting a queue.

FIG. 4 shows an example of switching an idle server instance 30.

The server instance controller 26 starts or activates server instances 30 (70). Server instances 30 may be started as needed or at once. Server instances 30 wait for requests (72), the dispatching controller 24 checks if there is a request with a matching service type (74). If there is one or more matching requests, the dispatching controller 24 dispatches the oldest request of the matching service type to the idle server instance 30 (76).

If there is no matching request (74), the server instance controller 26 determines if it should switch the idle server instance 30 to a different service type (78).

If the determination is affirmative, then the server instance controller 26 switches the service type of the idle server instance 30 to a different service type, depending on demand (80).

If the server instance controller 26 determines that the idle server instance 30 is not otherwise needed (78), it checks if the server instance 30 is idle for longer than a predetermined time period (82). If not, the server instance controller 26 lets the idle server instance 30 wait for a request with the matching service type (72).

If the server instance 30 is idle for longer than the predetermined time period (82), the server instance controller 26 terminates the idle server instance 30 (86).

If a very large number of service types and a large number of corresponding reserved server instances 30 are used in the request dispatching system 10, it would be difficult to manage them. A service type could be maintained as an ordered list of parameters, from most significant to least significant, and idle server instances could be matched to the request with the best service type match. However, applying the best match unconditionally would violate the requirement that requests be served in the order received. Accordingly, such a best matching method would not provide fair services to all requests.

By switching the service type of an idle server instance 30 when the oldest request has been outstanding for longer than an estimated time to accomplish the switching, the request dispatching system 10 can maintain a reasonable approximation of the queue order. Thus, fair service can be achieved.

Number of Server Instances vs. Available Memory in the Second Embodiment

To minimize switching costs, the total number NS of server instances 30 is set as high as possible, but not so high that the working set for all active server instances 30 exceeds the available physical memory.

In order to avoid excessive swapping, the total number NS of active server instances 30 is set no higher than AM divided by RM, as in the first embodiment.

The number of external resource connections may be managed by the total number NS of server instances. There may be a need to do this if, for example, there are license limits to the number of external server connections. Closing the connection when the local server instance is idle is also possible, but then re-opening them must be managed as part of the preparation cost.

Minimum Number NSPi in the Second Embodiment

When the total number NS of active server instances 30 is larger than the sum of the minimum number NSPi of server instance slots 28 reserved for each queue 22, server instances 30 may be switched and re-used among queues 22, as described above. In this case, the minimum number NSPi is preferably set to XB×NCPU. This setting allows to maximize state re-use of idle server instances 30. NCPU is the number of CPUs on each server computer in the system 14. XB relates to connection to external resources 16.

A server instance 30 that uses external resources 16 will be blocked some fraction B of its running life, waiting for these external resources 16. In this invention, in order to ensure that this blockage does not result in an idle CPU, the number of active server instances per CPU is increased by the ratio of the fraction B, e.g., the ratio XB=1/(1−B). For example, if local processes are blocked on external resources 50% of the time, 2 processes per local CPU are needed to keep all local CPU's busy. At 90% blocking, 10 processes per CPU are needed. Blocking factors substantially less than 50% are ignored.

Selection of Service Type to be Switched

Figure 5:
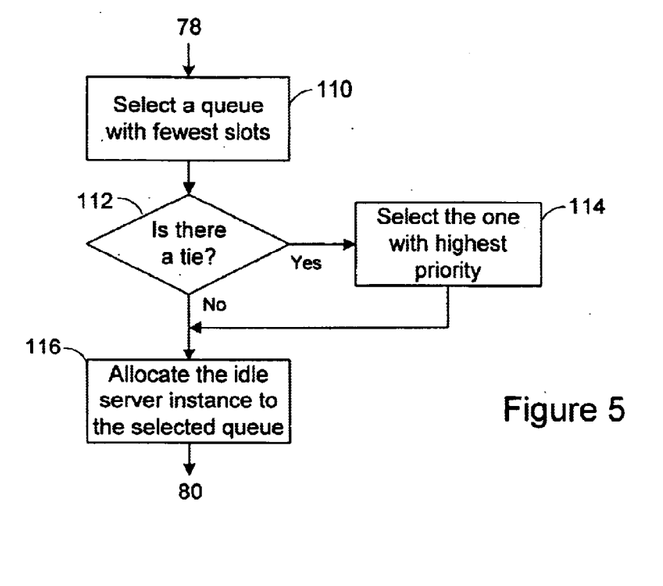
FIG. 5 is a flowchart showing another example process of selecting a queue.

At step 80 of FIG. 4, the request dispatching system 10 evaluates to which service type the idle server instance 30 may be switched, as shown in FIG. 5.

The dispatching system 10 selects a priority queue 22 that has the fewest allocated server instance slots 28, relative to the minimum number NSPi (110). For example, in an example having three priority queues, the minimum number NSPi may be set NSP1=1 for the low priority queue, NSP2=3 for the normal priority queue, and NSP3=4 for the high priority queue. If the numbers of server instance slots allocated to low, normal and high priority queues are three, three and five, respectively, then the low, normal and high priority queues have two, zero and one extra server instance slots, respectively, in addition to their minimum numbers NSPi. Accordingly, the dispatching system 10 selects the normal priority queue 22.

In the case of a tie (112), the dispatching system 10 selects the highest priority queue among the ties (114). In the above example, if four server instance slots are allocated to the high priority queue, then the normal and high priority queues are tie. In this case, the dispatching system 10 selects the high priority queue 22.

Then, the dispatching system 10 allocates the idle server instance 30 to the selected priority queue 22 (116).

Figure 6:
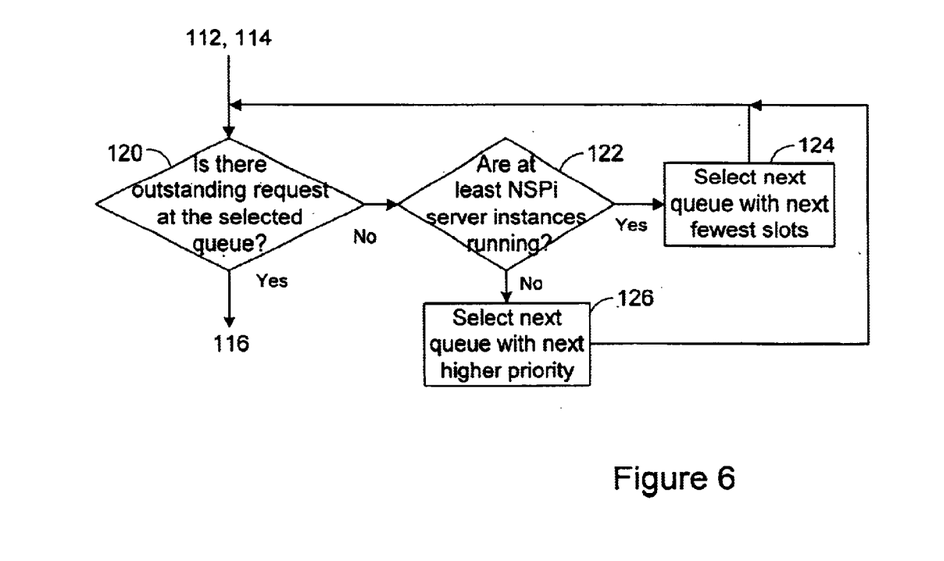
FIG. 6 is a flowchart showing the switching of server instances.

Prior to allocating the idle server instance 30 (116), as shown in FIG. 6, the dispatching system 10 may check if there are any outstanding requests at the selected priority queue (120).

If there are no outstanding requests at that priority queue 22 (120), the dispatching system 10 further checks if there are at least the minimum number NSPi of server instances 30 running requests at that priority queue 22 (122). If yes, the dispatching system 10 selects the next priority queue 22 having the next fewest allocated server instance slots 28 (124) and returns to step 120.

Thus, the minimum number NSPi of server instance slots are always provided for each queue 22. In other words, as long as NS is at least the total number NPQ of physical priority queues 22 in the dispatching system 10, and as long as the minimum number NSPi is at least 1 for each priority queue 22, then there is always at least one server instance slot 28 allocated to each priority, even if there are no outstanding requests at that priority. When a request arrives, it can always be dispatched immediately, unless there is already another request running at that priority.

Notwithstanding the above, the request dispatching system 10 may elect to skip a request, and look for a better match with the available idle server instance(s) 30. In this case, the request dispatching system 10 preferably manages the skipping such that the request is not skipped "indefinitely".

If there is more than one priority with free server instances 30, requests at the highest priority are dispatched first.

Balancing Algorithm

In order to determine whether an idle server instance 30 should be switched to a different service type or wait to see if a matching request arrives in step 78 in FIG. 4, it is preferable to invoke a balancing algorithm.

The balancing algorithm may use a zero cost method, simple cost method or actual cost method.

According to the zero cost method, the dispatching system 10 assumes that switching costs are zero. In this approach, there is no balancing across server instances. This is the simplest balancing algorithm.

The simple cost method may be used for requests that already have estimated and/or average run costs. A fixed time may be estimated for the preparation costs for each request type. According to the simple cost method, the dispatching is balanced whenever there is an idle server instance, and the request age exceeds the estimated preparation cost, expressed as real-time. It is also balanced whenever there is no idle server instance, but the request age exceeds the sum of the estimated preparation and run costs.

Instead of using simple costs, actual preparation costs may be used. The calculation of actual preparation costs may be done by recording more cost estimates/averages, and by evaluating several dispatch alternatives. Actual costs may be used when the simple costs are clearly inadequate.

If no balancing is indicated by the current queue contents, then the oldest request that is an exact type match for any available server instance is dispatched to that instance, regardless of priority. interactive/asynchronous attributes may be considered as they are part of the service type, and have reserved server instances.

Balancing is indicated whenever a request age exceeds a threshold computed from the balancing factors. If balancing is required, then the request that most exceeds the balancing factors is selected for dispatching, and a server instances is allocated, by either starting a new server instance (provided the limit has not been reached), or switching the closest available match.

Optionally, request dispatching system 10 records and maintains estimates of request preparation costs.

Borrowing Option

The system 10 may allow "borrowing" of server instances by a higher priority queues.

In FIG. 6, if there are no outstanding requests at that priority queue 22 (120) and there are fewer than NSPi running requests at that priority (122), the dispatching system 10 may allow "borrowing" of the server instance 30 by a higher priority queue 22. That is, the dispatching system 10 selects the next priority queue 22 that is higher priority than that of the current queue 22 (126), and returns to step 120.

This allows a high-priority request to "borrow" server instance slots 28 from a lower priority queue 22, if there are no pending requests at the lower priority. This respects priority, but still avoids starvation, as long as that higher priority requests take a lot less time to run than lower priority requests and will therefore block a request at the "right" priority for only a "short" time.

The balancing algorithm may determine suitability of the "borrowing" of server instances 30 so that the number of server instance slots 28 of a given priority queue 22 may temporarily fall below the minimum number NSPi. This approach increases the potential for starvation to occur, and must be used only with due care and attention to that issue.

Example System with Two Queues

Figure 7:
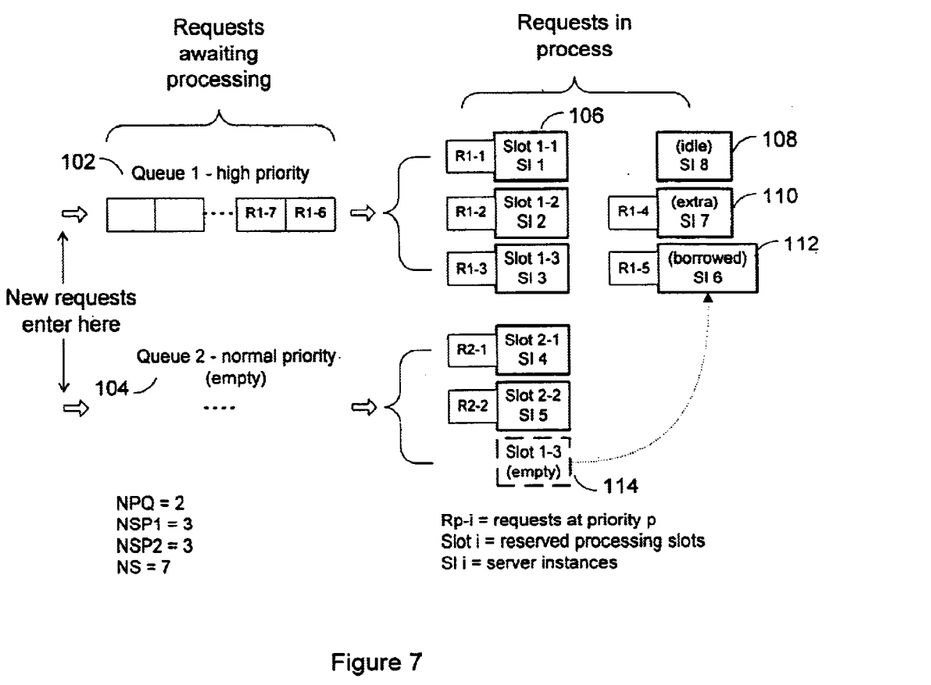
FIG. 7 is a diagram showing an example system with two queues.

FIG. 7 shows an example system 100 with two queues 102 and 104. The total number NPQ of physical queues is 2. Queue 102 is associated with high priority. The minimum number NSP1 for queue 102 is set to 3. It currently has two requests R1-6 and R1-7 queued. Queue 104 is associated with normal priority. The minimum number NSP1 for queue 104 is also set to 3. It is currently empty.

The total number NS of active service instances is set to 7. For queue 102, currently three server instances SI 1 to SI 3 at reserved slots 1-1 to 1-3 (106) and an extra server instance S17 (110) are processing requests R1-1 to R1-3 and R1-4 (105). Server instance SI 8 is currently idle (108).

For queue 104, three slots 2-1 to 2-3 are reserved. However, only slots 2-1 and 2-2 have slot instances SI 4 and SI 5 which are processing it requests R2-1 and R2-2. Since queue 104 is empty, server instance SI6 is borrowed by queue 102 (112) to process request R1-5. Thus, slot 2-3 is empty.

The server system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method for dispatching requests to a predetermined number of server instances to process multiple requests in parallel, each request having a priority, the method comprising steps of:

utilizing one or more queues, each queue being associated with a priority for queuing requests having the priority;

setting a minimum number of potential server instances for each queue to one or more;

allocating to each queue at least the minimum number of potential server instances; and dispatching each request in each queue to its corresponding server instance when a potential server instance allocated to the queue is available.

2. The method as claimed in claim 1, wherein the setting step sets the minimum number of server instances for each queue to the total number of active server instances divided by the total number of the queues when all server instances are to be allocated to the queues.

3. The method as claimed in claim 2, wherein, if the divided value is not an integer, the setting step rounds up the divided value starts at a queue having a highest priority, until the sum of all the minimum numbers becomes the total number of active server instances.

4. The method as claimed in claim 1, wherein the setting step includes a step of determining, for each queue, the minimum number of server instances such that the minimum number for a queue associated with higher priority is the same as or greater than that of a queue associated with lower priority.

5. The method as claimed in claim 1 further including a step of setting a process execution priority of a computer system on which the server instances are running according to the priority of the requests.

6. A method for queuing and dispatching requests to multiple processors in order to process multiple requests in parallel, each request having a priority, the method comprising steps of:

utilizing one or more queues, each queue being associated with a priority for queuing requests having the priority;

setting a minimum number of processing resources for each queue to one or more;

allocating to each queue at least the minimum number of processing resources; and dispatching each request in each queue to its corresponding processing resource when the processing resource is available.

7. The method as claimed in claim 6, wherein the setting step sets the minimum number of processing resources for each queue to the total number of active processing resources divided by the total number of the queues when all active processing resources are to be allocated to the queues.

8. The method as claimed in claim 7, wherein, if the divided value is not an integer, the setting step rounds up the divided value starts at a queue having highest priority, until the sum of all the minimum numbers becomes the total number of active processing resources.

9. A request dispatching system for dispatching requests to a predetermined number of server instances to process multiple requests in parallel, each request having its priority, and each request being queued in a queue which is associated with its priority, the request dispatching system comprising:

a server instance controller for controlling allocation of server instances to each queue such that each queue maintains at least a minimum number of potential server instances to serve requests of the priority of the queue, wherein the minimum number for each queue is set to one or more; and a dispatching controller for controlling dispatching of each request in each queue to its corresponding server instance when a potential server instance reserved for the queue is available.

10. The request dispatching system as claimed in claim 9, wherein the server instance controller having a function of setting the minimum number of potential server instances for each queue to the total number of active server instances divided by the total number of the queues.

11. The request dispatching system as claimed in claim 10, wherein, if the divided value is not an integer, the determining function rounds up the divided value starts at a queue having highest priority as its priority, until the sum of all the minimum numbers becomes the total number of active server instances.

12. The request dispatching system as claimed in claim 9, wherein the server instance is a single-processing processor, a process of a multi-process server program or a thread of a multi-threaded server program.

13. The request dispatching system as claimed in claim 12, further comprising means for setting process execution priority of a computer system on which the server instances are running according to the priority of the requests.

14. The request dispatching system as claimed in claim 12, wherein the setting means sets, for each queue, the minimum number of potential server instances such that the minimum number for a queue associated with higher priority is the same as or greater than that of a queue associated with lower priority.

15. A computer readable memory for storing computer executable instructions for carrying out a method of queuing and dispatching requests to a predetermined number of server instances to process multiple requests in parallel, each request having its priority, the method comprising steps of:

utilizing one or more queues, each queue being associated with a priority for queuing requests having the priority;

setting a minimum number of potential server instances for each queue to one or more;

allocating to each queue at least the minimum number of potential server instances; and dispatching each request in each queue to its corresponding server instance when a potential server instance allocated to the queue is available.

16. A computer readable memory for storing computer executable instructions for carrying out a method of queuing and dispatching requests to a predetermined number of server instances to process multiple requests in parallel, each request having its priority, the method comprising steps of:

utilizing one or more queues, each queue being associated with a priority for queuing requests having the priority;

setting a minimum number of potential server instances for each queue to one or more;

allocating to each queue at least the minimum number of potential server instances; and dispatching each request in each queue to its corresponding server instance when a potential server instance allocated to the queue is available.

* * * * *